United States Patent [19]
Feller

[11] Patent Number: 4,462,264
[45] Date of Patent: * Jul. 31, 1984

[54] ACOUSTIC FLOW SENSORS

[75] Inventor: Murray F. Feller, Dunnellon, Fla.

[73] Assignee: Wilgood Corporation, Dunnellon, Fla.

[*] Notice: The portion of the term of this patent subsequent to Sep. 14, 1999 has been disclaimed.

[21] Appl. No.: 388,240

[22] Filed: Jun. 14, 1982

Related U.S. Application Data

[63] Continuation-in-part of Ser. No. 176,904, Aug. 11, 1980, Pat. No. 4,348,906.

[51] Int. Cl.³ .............................................. G01F 1/10
[52] U.S. Cl. .................... 73/861.18; 73/861.77
[58] Field of Search ........... 73/861.25, 861.18, 861.77, 73/861.89

[56] References Cited

U.S. PATENT DOCUMENTS 3,751,979  8/1973  Ims .................................. 73/861.27
3,788,285  1/1974  Gelin et al. .................. 73/861.77 X
4,348,906  9/1982  Feller ............................. 73/861.77

FOREIGN PATENT DOCUMENTS 231518    3/1959  Australia ........................ 73/861.77
2081224  12/1971  France ........................... 73/861.77

Primary Examiner—Herbert Goldstein

[57] ABSTRACT

Disclosed acoustic flow sensors include a cylindrical wall that forms a cylindrical flow passage, a flow activated rotor in the passage, and an electrical generator for developing flow-representing signals. In probe type flow sensors, the cylindrical wall is a shroud surrounding the rotor and forming a flow metering passage within a larger main passage, and the disclosed one or two piezoelectric device is/are decoupled from the fluid outside the shroud by sound-deadening material and coupled to the fluid within the shroud. For both probe-type flow sensors, and in-line flow sensors, the cylindrical wall is stressed and subjected to arcuate dimension change by piezoelectric device(s) of the radial-mode type bonded to the cylindrical wall.

14 Claims, 4 Drawing Figures

ACOUSTIC FLOW SENSORS

This is a continuation-in-part of my copending application Ser. No. 176,904 filed Aug. 11, 1980, now U.S. Pat. No. 4,348,906 issued Sept. 14, 1980.

The present invention relates to acoustic flow sensors.

The specification and drawings of that application are incorporated herein by reference as fully as if same were copied here. That application discloses acoustic flow sensors wherein an acoustic transducer is mounted on the wall of a pipe, or transmitting/receiving acoustic transducers are mounted on the wall of a pipe, opposite a vaned rotor inside the pipe, expecially a turbine-type rotor. The transmitting-receiving transducer (or the transmitter) generates an acoustic carrier signal, while the transmitting-receiving transducer (or the receiver) receives signals modulated by the successive pockets of the rotor as an indication of its rotation.

An object of the present invention resides in providing acoustic flow sensors having improved characteristics. In one aspect, the present invention provides novel acoustic flow sensors capable of producing high modulated signal output relative to ambient electrical "noise", and more particularly to do so without resort to critical or unstable sharply tuned resonant circuits. In achieving this object, an acoustic transducer that acts as a transmitting and receiving device or separate acoustic transducer for transmitting and receiving, respectively, are bonded to a wall that surrounds the fluid-driven rotor, at least one of the transducers being of the so-called radial-mode type.

Acoustic transducers are known of both the "piston" type and the "radial-mode" type. In an acoustic transmitter of the piston-type, electrical excitation applied to electrodes on opposite faces of a piezoelectric body are converted into dimension change that is perpendicular to the electrodes, thus tending to increase and decrease alternately the thickness of the piezoelectric body between the electrodes. In the radial-mode type, electrical excitation applied to electrodes on opposite faces of a piezoelectric body are converted into dimension changes in the plane perpendicular to the applied electrical stress, i.e., parallel to electrodes on opposite flat faces of the piezoelectric body. Actually, piezoelectric bodies operate in both modes concurrently. However, by suitably proportioning the piezoelectric body and/or by suitably conditioning the material during production, one or the other mode is made distinctly predominant. The resulting piezoelectric device is known according to the predominant mode. Radial-mode transducers ordinarily are round or rectangular flat plates, while piston-mode transducers tend to be thick, being cylinders or other shapes of substantial length between the electrodes.

When an electrode of a radial-mode piezoelectric device is united or bonded to a wall that surrounds a vaned rotor in a flow sensor, it has been found that there is a remarkably large degree or percentage of modulation of the received acoustic signal, converted into an electrical signal by the same or preferably a separate piezoelectric device, as compared to that of a piston-type piezoelectric device in the same flow sensor. When separate piezoelectric devices are used for the transmitter and the receiver, the results are excellent where both of the piezoelectric devices are of the radial-mode type. In this application, ceramic plates as of lead zirconate titanate or barium titanate, for example, have proved quite successful.

The following is a possible explanation for the notable results achieved with a radial-mode piezoelectric plate having one electrode-covered face united or bonded to the wall of a flow-sensor. The dimensional changes of the radial-mode piezoelectric plate seemingly are imposed on the segment of the wall to which the plate is bonded. When such a piezoelectric device is excited by oscillations, an arc or segment of the cylinder grows and contracts. The change of radius then would force the wall segment to behave like the diaphragm of a loudspeaker, pulsing toward and away from the cylindrical axis. The piston-type of piezoelectric plate, however, seemingly can only impose alternating radial vibration essentially on the area of the cylinder facing the area of the piezoelectric device. Whatever the true explanation may be, the radial-mode type of piezoelectric device, with an electrode-bearing face bonded to the wall surrounding the flow-responsive rotor, yields a modulated signal as the rotor turns having an excellent percentage of modulation. The vanes of the rotor represent a structure that serves two functions in the illustrative apparatus. The vanes cause the rotor to turn as liquid flows. Separately, the vanes vary the acoustic pattern as the rotor turns so that the modulated output signal is developed. Where the rotor is mounted in a pipe that forms the vibrated wall, the flow sensor is of the in-line type.

A further object of the invention resides in providing a novel probe-type acoustic flow sensor.

Probe-type flow sensors have been known for some time. They are especially useful where a flow sensor is to be installed in an existing pipe, especially a large-diameter pipe. A hole may be drilled and tapped in the wall of the pipe for installing a probe-type flow sensor. This represents a considerable advantage because it may be impractical to break into the pipe to install an in-line flow sensor. It is also economical to use one or more probe-type sensors in large-diameter pipes.

A novel flow-sensing probe includes a cylindrical shroud around the flow-responsive rotor, with a piezoelectric plate bonded to the exterior of the shroud. Just as in the case of an in-line piezoelectric flow sensor, a radial-mode piezoelectric device develops excellent output as compared to that of the same sensor with a piston-type piezoelectric transducer. However, the output rises considerably when the outer surface of the cylindrical shroud is covered with sound-deadening or or acoustic-energy-absorbing material such as cork, providing acoustic isolation of that outer surface from the ambient fluid. The inner surface of the shroud is exposed, of course, to be directly coupled acoustically to the fluid in the passage containing the rotor. A possible explanation for the improvement is that the acoustic-energy-absorbing material prevents the liquid outside the shroud from loading the piezoelectric transducers and the shroud itself. Consequently, the acoustic energy of a piezoelectric device acting as a transmitter is conserved for its effect on the cylindrical wall to which it is bonded. Correspondingly, the acoustic-energy-absorbing material prevents the liquid surrounding the shroud from loading the shroud and the transducer that acts as a receiver of rotor-modulated signals inside the shroud. If the sound-absorbing material were omitted, the liquid outside the shroud would load the transducers and the shroud passively, thus reducing the percentage of modulation of the flow-sensor signal.

Figure 2:
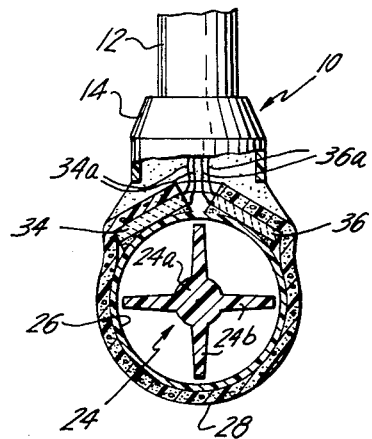
FIG. 2 is a fragmentary cross-section of the flow sensor at the plane 2—2 in FIG. 1.
Figure 1:
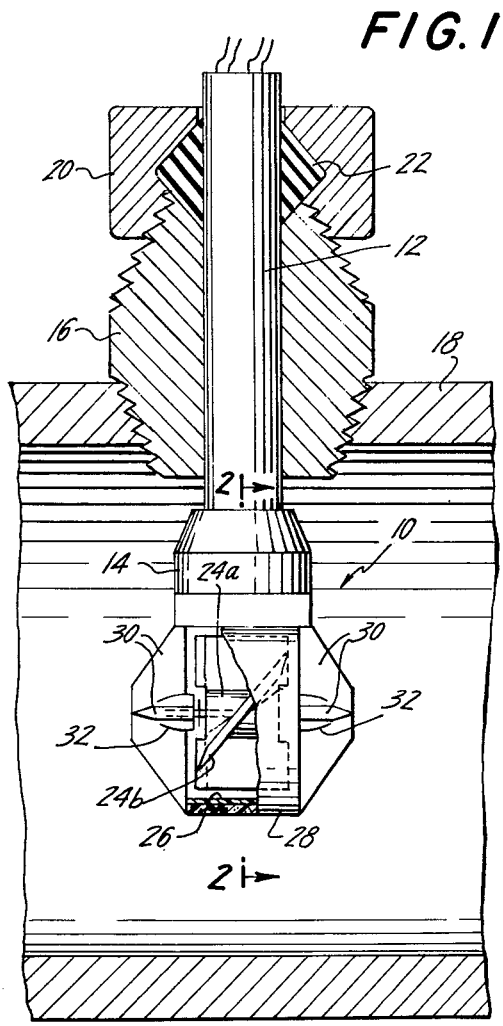
FIG. 1 is a side view of a novel acoustic flow sensor, being a presently preferred embodiment of the invention, a portion of the rotor-surrounding shroud being broken away to show part of the flow-responsive rotor.

Referring now to FIGS. 1 and 2, flow-sensing probe 10 includes a supporting tube 12 and a top support 14 which comprises an inverted cup of molded plastic filled with unifying potting material as of epoxy resin. Tube 12 supports probe 10 in pipe 18. Tube 12 extends through stub 16 which is threaded into pipe 18. Clamp 20 is threaded to the opposite end of stub 16 and tightens gasket 22 as of rubber against tube 12 to form a liquid-tight seal. The diameter of the hole in pipe 18 sealed by stub 16 is large enough to admit the assembly A of rotor 24, shroud 26 with its cover 28 and vanes 30 that support hubs 32.

Radial-mode piezoelectric transducers 34 and 36 are ceramic plates of piezoelectric material such as barium titanate or lead zirconate titanate. Metal films or electrodes are united to the opposite broad parallel faces of transducers 34 and 36. These are radial-mode piezoelectric devices which become extended and contracted alternately when excited by alternating voltage. Leads 34a and 36a provide circuit connection to the electrodes. Devices 34 and 36 are bonded to the exterior of shroud 26 by an epoxy resin that solidly fills the space between the curved exterior of cylindrical shroud 26 and a flat electrode of each device 34, 36. In the example, devices 34 and 36 are centered at points on the shroud exterior separated about 60° apart. Devices 34 and 36 are plates of about 0.4-by-0.4-by-0.015 inch. Shroud 26 in an example is 0.03-inch thick polysulfone. Its inner surface is bare and its outer surface is covered by a wrap of sound-deadening material such as reconstituted cork or cellular neoprene, about 0.06 inch thick in an example.

Rotor 24 in an example is formed of polysulfone or polypylene. Hub 24a is 0.30" long and 0.20" in diameter. Turbine-type blades 24b of the rotor have diametrically opposite edges 0.800 inch apart and are 0.450 inch long, measured from end to end. The opposite ends of each blade are tapered to sharp edges. The opposite radial edges of each blade are 45° apart so that each blade twists in a somewhat helical manner, causing rotation of the rotor in response to flow of fluid such as water or oil along the rotor axis. Shroud 26 used with this rotor has an internal diameter of 0.85 inch and an axial length of 0.60 inch. The foregoing details are illustrative, obviously being subject to a wide range of changes.

In operation, one piezoelectric device 34 may be excited at a frequency in the range 6.8–7.03 kHz to act as a transmitter in water. For sensing oil flow, a frequency about 0.3 kHz higher improves results. An audible warble can be heard corresponding to the frequency of blades 24b (or the pockets they form) passing the transmitter. The radial-mode device 34 alternately becomes longer and shorter tangentially of the shroud. Evidently it stretches and contracts a corresponding segment of the shroud, thus causing an arc of the shroud to move radially outward and inward similar to a vibrating diaphragm. The effect of that vibration on transducer 36 varies with the attitude of the rotor. When both transducers communicate from one segment of shroud 26 to the other via the liquid within a pocket of the rotor (no rotor vane interposed) the transducers evidently interact more than occurs when a blade is centered between them as shown. The acoustic energy directly coupled to the liquid from the segment of the shroud that is vibrated by transmitter 34 travels through the liquid and tends, alternately, to stretch and relax the directly coupled segment of the shroud bearing receiving transducer 36. The resulting output at the excitation frequency varies peak-to-peak during rotation of the rotor. The outer surfaces of the transducers and the shroud (to which the transducers are bonded) are decoupled acoustically from the liquid outside the shroud to avoid the loading effect of that liquid on the transducers.

The modulation of the received signal has components of both amplitude modulation and phase modulation. Various forms of detector can be used for detecting either form of modulation, or both.

Figure 3:
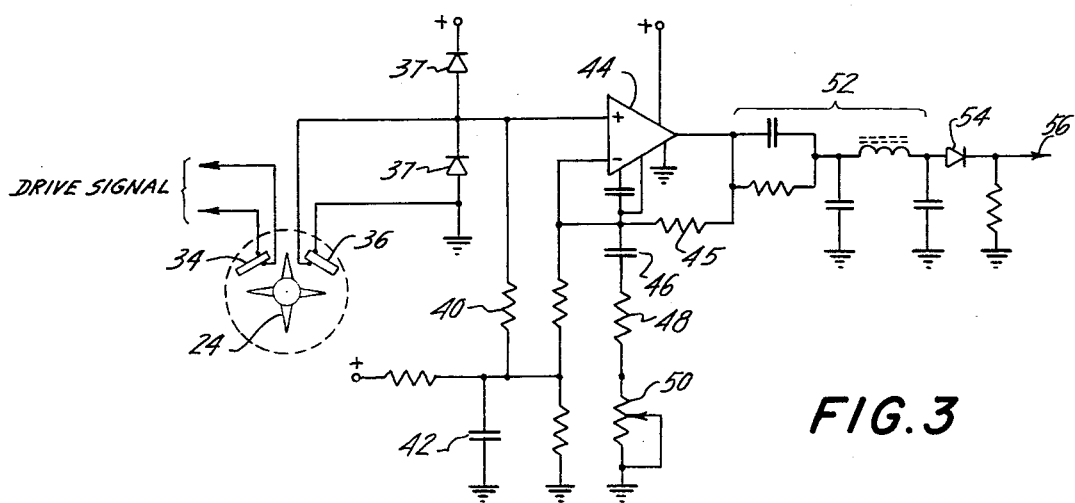
FIG. 3 is a wiring diagram of an illustrative operating circuit for the probe in FIGS. 1 and 2.

An illustrative amplitude detector is shown in FIG. 3. Transducer 36 is connected to the (+) terminal of high-gain amplifier 44. Diodes 37 protect amplifier 44 from high-voltage spikes.

In the interest of economy, small piezoelectric devices 34 and 36 are used, operating as high impedance devices, well below their resonant frequency. For example, device 36 has a capacitance of 5000 pf. Resistor 40 of 10,000 ohms and bypass capacitor 42 serve to load device 36 (considered as a signal source) to suppress 60 Hz spurious signals that might be picked up, without appreciably affecting the output of device 36 at 7 kHz.

Intergrated-circuit high-gain amplifier 44 includes a negative feedback circuit that causes the gain of the amplifier to be very low at 60 Hz. However, negative feedback at 7 kHz is sharply reduced by series resistor 45 and bypass capacitor 46, so that the gain of the amplifier is relatively high at 7 kHz. Resistors 48 and 50 adjustably limit the 7 kHz bypass to control the amplifier gain at that frequency.

Spurious high frequency signals above 7 kHz that may be present are suppressed by network 52.

Diode 54 demodulates the signal, yielding a modulation wave at output terminal 56. The interaction of piezoelectric devices 34 and 36 in the region of rotor 24 yields a simple wave modulation on the 7 kHz carrier, yielding two waves per pocket or per vane of the rotor passing the transducers. (The same structure yields one wave per pocket at 3.5 kHz with a somewhat weaker demodulated signal and with a somewhat lower percent modulation.) Still higher carrier frequencies have certain advantages. However, there may be beat frequencies, and the form of the demodulated wave may have a complex relationship to each vane or pocket of the rotor that passes the transducer, possibley causing ambiguity or requiring critical adjustment.

Figure 4:
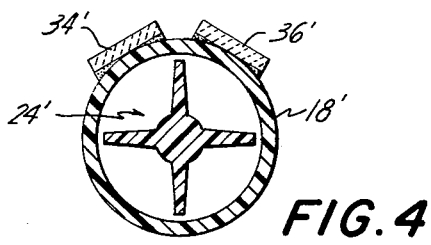
FIG. 4 represents a modification of FIG. 2.

The feature of the acoustic transducers being of the radial-mode type is a distinct advantage not only when, as above, separate transmitting and receiving transducers are used, but also where a single transducer is used both for transmitting the drive signal and for deriving the modulated flow-representing signal as the rotor is driven by the liquid flow. Moreover, the configuration shown in FIGS. 1 and 2 is also applicable where the radial-mode acoustic transducers are bonded to the wall of a pipe, in the in-line type of flow sensors (as distinguished from probe-type flow sensors) including (see FIG. 4) rotor 24' and radial-mode piezoelectric devices 34' and 36' bonded on plastic pipe 18'. In FIG. 4, there is ordinarily no need for the acoustic absorbing material 28 that markedly improves the output of the above described probe-type acoustic flow sensors.

The shroud of a probe-type flow sensor forms a sampling passage for the total flow within the main passage of the pipe. The output of a probe-type flow sensor may be calibrated to represent the total flow in pipes of various diameters. Plural probe-type flow sensors may be used together and their outputs can be combined appropriately to take into account various flow rates across the pipe's cross-section.

When two arcuately separated transducers are used, as in the above-described example, but with the 90° separation of the vanes of the rotor in that example, the proportions given above assure ample interaction between the transducers and yields a simple unambiguous form of modulated wave. Spacing the transducers so that they subtend approximately an arc equal to the rotor vane separation is recommended. In this example, the transducers are centered at points about 60° apart so that the remote edges of the two transducers (0.4×0.4 inch in this example on a shroud of 0.91 outside diameter) subtend an angle of 108°. This is inconsequentially larger than the 90° separation of the rotor's vanes. Of course, there are other successful relationships of separate transmitting and receiving transducers. Thus, in a successful arrangement, separate transmitting and receiving devices were bonded to the exterior of a shroud, both centered at the same arcuate position but at different positions along the flow (not overlapping one another).

The illustrative embodiment of the invention and its variations as described above are amenable to modification and varied application by those of ordinary skill in the art. Consequently, the invention should be construed broadly in accordance with its true spirit and scope.

What is claimed is:

1. A flow sensor including a cylindrical wall defining a fluid-flow passage, a flow-metering rotor supported in said passage for rotation by fluid flowing therein, and an electrical signal generator including piezoelectric transducer means cooperating with said rotor for developing a sustained flow-representing electrical signal that is modulated in dependence on the flow-induced changes in the relationship of said piezoelectric transducer means and said rotor, said piezoelectric transducer means including at least one radial-mode piezoelectric transducer bonded to a segment of said wall so that said one piezoelectric transducer and said wall segment are coupled to each other for oscillatory stress and dimension change at least approximately along an arc of the cylindrical wall, the surface of said wall segment facing the rotor being exposed and thereby coupled to fluid in said passage.

2. A flow sensor as in claim 1 wherein said rotor has flow-activated vanes evenly separated arcuately and wherein said piezoelectric transducer means includes a second radial-mode piezoelectric transducer bonded to a second segment of said wall so that said second piezoelectric transducer and said second wall segment are coupled to each other for oscillatory stress and dimension change at least approximately along an arc of the cylindrical wall, the surface of said second wall segment facing the rotor being exposed and thereby coupled to fluid in said passage for being stressed thereby.

3. A flow sensor as in claim 2 wherein said electric signal generator includes sustained excitation signal means connected to said one piezoelectric transducer and demodulator connected to said second piezoelectric transducer.

4. A flow sensor as in claim 1 or 2, further including a pipe, said cylindrical wall being a shroud extending about the rotor and having support means extending inward from the wall of the pipe for locating the shroud within the pipe.

5. A flow sensor as in claim 4 wherein said piezoelectric transducer means and said shroud are covered externally by sound-deadening material.

6. A flow sensor as in claim 1, further including a pipe, said cylindrical wall being a shroud extending about the rotor and having support means extending inward from the wall of the pipe for locating the shroud within the pipe, wherein said rotor has flow-activated vanes that define pockets cooperating with the transducer means of the electrical signal generator.

7. A flow sensor as in claim 1 wherein said cylindrical wall is a pipe so that the flow sensor is of the in-line type, said one piezoelectric transducer being on the exterior of the pipe and said pipe being imperforate opposite said transducer.

8. A flow sensor as in claim 1 wherein said electric signal generator includes sustained excitation signal means and a demodulator connected to said piezoelectric transducer means.

9. A probe-type flow sensor including a wall defining a main fluid passage, a shroud supported within said main passage and spaced from said wall so as to define a sampling passage, a rotor within said shroud arranged to rotate in response to fluid flow in the sampling passage, and an electrical signal generator including electro-acoustic transducer means carried by the shroud and contained within said main passage, said electro-acoustic means being coupled at a first side thereof to fluid in said sampling passage for developing flow-representing output that varies in dependence on flow-induced changes in the relationship of the electro-acoustic means and the rotor, and acoustic decoupling means between said electro-acoustic means and space in the main passage outside the shroud.

10. A probe-type flow sensor as in claim 9 wherein said electro-acoustic means comprises at least one piezoelectric transducer bonded to said shroud.

11. A flow sensor as in claim 9 wherein said electro-acoustic means comprises first and second piezoelectric transducers bonded to said shroud and spaced apart about said rotor, and wherein said electric signal means includes excitation signal means connected to said first piezoelectric transducer and a demodulator connected to second piezoelectric transducer.

12. A probe-type flow sensor as in either claim 10 or 11 wherein said acoustic decoupling means extends on the exterior of said shroud.

13. A flow sensor as in claim 12 wherein said rotor has flow-activated vanes that define pockets cooperating with the transducer means of the electrical signal generator.

14. A flow sensor as in any of claims 1, 3, or 9–11 wherein said rotor has flow-activated vanes that define pockets cooperating with the transducer means of the electrical signal generator.

* * * * *